United States Patent [19]
Giraudon

[11] 3,759,938
[45] Sept. 18, 1973

[54] THIAZOLIDINE DERIVATIVES
[75] Inventor: Raymond Giraudon, Lesigny, France
[73] Assignee: Rhone-Poulenc S.A., Paris, France
[22] Filed: July 15, 1971
[21] Appl. No.: 163,071

[30] Foreign Application Priority Data
July 17, 1970 France .............................. 7026473
Oct. 9, 1970 France .............................. 7036618
Apr. 16, 1971 France .............................. 7113534

[52] U.S. Cl............... 260/306.7, 260/454, 260/470, 260/558 R, 260/562 B, 424/270
[51] Int. Cl............................................. C07d 91/16
[58] Field of Search ................................. 260/306.7

[56] References Cited
UNITED STATES PATENTS
3,064,003 11/1962 Satzinger ........................ 260/306.7
3,287,467 11/1966 Gerjovich ....................... 260/306.7
3,671,650 6/1972 Islip ................................. 260/306.7

Primary Examiner—Richard J. Gallagher
Attorney—Stevens, Davis, Miller & Mosher

[57] ABSTRACT
Compounds of the formula:

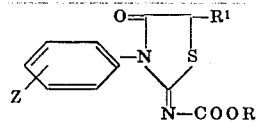

wherein R represents alkyl of one through four carbon atoms, R¹ represents hydrogen, alkyl of one through four carbon atoms or phenyl, and Z represents amino or a group -NH-CO-R² in which R² represents hydrogen, or alkyl or alkoxy of one through four carbon atoms, possess fungicidal and anthelmintic properties.

14 Claims, No Drawings

THIAZOLIDINE DERIVATIVES

This invention relates to new thiazolidine derivatives, to processes for their preparation and to compositions containing them.

The thiazolidine derivatives of the present invention are those of the general formula:

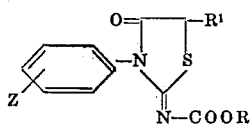

I wherein R represents an alkyl radical containing one to four carbon atoms, $R^1$ represents a hydrogen atom, an alkyl radical containing one to four carbon atoms or a phenyl radical, and Z represents an amino radical or a group $-NH-CO-R^2$, in which $R^2$ represents a hydrogen atom, or an alkyl or alkoxy radical containing one to four carbon atoms; preferably the substituent Z is in the orthoposition of the phenyl ring.

According to a feature of the invention, the thiazolidine derivatives of general formula I wherein Z represents a group $-NH-CO-R^2$, $R^2$ being as hereinbefore defined, are prepared by the process which comprises reacting an alkyl halogenoformate of the general formula:

Hal - COOR (II)

(wherein R is as hereinbefore defined and Hal represents a halogen, preferably chlorine, atom) with a thiazolidine derivative of the general formula:

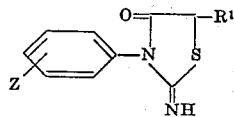

III wherein $R^1$ and Z are as hereinbefore defined. The reaction is generally carried out in an anhydrous organic solvent, such as pyridine, at a temperature below 25° C.

The starting materials of general formula III can be prepared by cyclisation of a thiocyanate of the general formula:

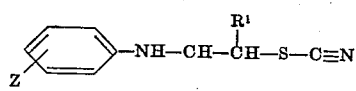

IV wherein $R^1$ and Z are as hereinbefore defined.

The thiocyanates of general formula IV can be obtained, optionally in situ, by reaction of an alkali metal thiocyanate with a compound of the general formula:

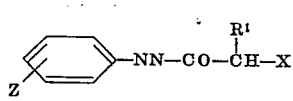

V wherein $R^1$ and Z are as hereinbefore defined, and Y represents a halogen atom, preferably chlorine.

In general, the reaction between the alkali metal thiocyanate and the compound of general formula V, and the cyclisation of the thiocyanate of general formula IV, are carried out in an organic solvent, such as a ketone (e.g. acetone) or an aromatic hydrocarbon, at a temperature between 20° C. and the boiling point of the reaction mixture, optionally in the presence of an alkaline agent, such as triethylamine.

The compounds of general formula V can be obtained by reaction of an acid halide of the general formula:

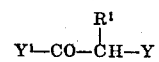

VI (wherein Y and $Y^1$ are the same or different, and each represents a halogen atom, and $R^1$ is as hereinbefore defined) with an aniline derivative of the general formula:

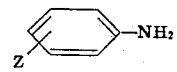

VII wherein Z is as hereinbefore defined.

According to another feature of the invention, the thiazolidine derivatives of general formula I wherein Z represents a group $-NH-CO-R^2$, $R^2$ being as hereinbefore defined, are prepared by the process which comprises reacting an acid halide of the general formula:

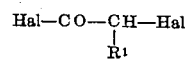

VIII (wherein the symbols Hal are the same or different and each represents a halogen, preferably chlorine, atom, and $R^1$ is as hereinbefore defined) with an aniline derivative of the general formula:

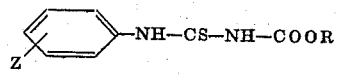

IX wherein R and Z are as hereinbefore defined. The reaction is generally carried out in a polar organic solvent, such as dimethylformamide, at a temperature of between 0° and 50° C.

The aniline derivatives of general formula IX can be obtained by reaction of an isothiocyanate of the general formula:

S = C = N − COOR (X)

(wherein R is as hereinbefore defined) with an aniline of general formula VII. The reaction is preferably carried out in an inert organic solvent, such as acetone or benzene, at a temperature below 15° C.

According to another feature of the invention, the thiazolidine derivatives of general formula I wherein Z represents an amino radical, are prepared by the process which comprises reducing a 3-(nitrophenyl)-thiazolidine of the general formula:

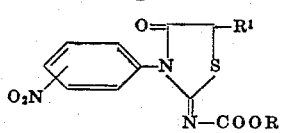

XI (wherein R and $R^1$ are as hereinbefore defined) by known methods for the reduction of a nitro radical to an amino radical without affecting the rest of the molecule. The reduction can be carried out with hydrogen in the presence of a catalyst. The process is generally carried out under pressure, in the presence of a palladium on charcoal catalyst, and at a temperature of about 20° C. The reduction can also be carried out with iron in an acid medium and at a temperature between 25° and 70° C.

The 3-(nitrophenyl)-thiazolidine compounds of general formula XI can be prepared in accordance with th methods which have been described hereinbefore for obtaining compounds of general formula I in which Z represents a -NH-CO-$R^2$ group, $R^2$ being as hereinbefore defined.

According to a still further feature of the invention, the thiazolidine derivatives of general formula I, wherein Z represents a group -NH-CO-$R^2$, $R^2$ being as hereinbefore defined, are prepared by the process which comprises reacting a compound of the general formula:

$$R^2 - CO - T$$

(XII)

(wherein $R^2$ is as hereinbefore defined, and T represents a hydroxy radical, a halogen atom or an -O-CO-$R^2$ group when $R^2$ represents an alkyl radical, or T represents a halogen atom when $R^2$ represents an alkoxy radical) with a 3-(aminophenyl)thiazolidine of the general formula:

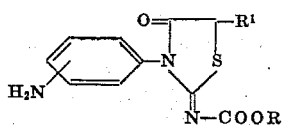

XIII wherein R and $R^1$ are as hereinbefore defined.

When $R^2$ represents an alkyl radical and T represents a halogen atom, the process is generally carried out in an organic solvent, such as methylene chloride, and optionally in the presence of a basic condensation agent, such as triethylamine. When $R^2$ represents an alkyl radical and T represents a hydroxy radical or an -O-CO-$R^2$ group, the process is generally carried out with or without a solvent and at a temperature of about 100° C. When $R^2$ represents an alkoxy radical and T represents a halogen atom, the process is generally carried out in an anhydrous organic solvent, such as pyridine, and at a temperature below 25° C.

The thiazolidine derivatives of general formula I possess useful fungicidal properties; they have particularly interesting contact activity against cucumber mildew (*Erysiphe cichoracearum*), apple mildew (*Podosphaera leucotricha*), bean anthracnose (*Colletotrichum lindemuthianum*) and wheat rust (*Puccinia glumarum*) when applied at quantities of between 10 and 50 g. per hectolitre of liquid diluent. They furthermore have the advantage of being systemic, in particular when they are applied by sprinkling the soil with liquid compositions containing them, against bean anthracnose and against cucumber mildew at doses greater than or equal to 0.1 g/hectolitre.

The thiazolidine derivatives of general formula I also possess useful anthelminthic properties. *In vitro*, they have shown themselves particularly active against larvae of digestive threadworms of horses at concentrations between 1 g. and 1 mg. per litre of solution. *In vivo*, they have shown themselves active against *Haemonchus contortus*, *Trichostrongylus axei* and *Trichostrongylus colubriformis* at doses of 100 mg/kg administered orally to sheep.

The compounds of general formula I wherein R represents a methyl or ethyl radical, $R^1$ represents a hydrogen atom and Z represents an amino, formamido or acetamido radical, the substituent Z being attached to the 2-position of the phenyl nucleus, are of outstanding value as fungicides and as anthelmintics. The preferred compounds are 2-methoxycarbonylimino-3-(2-aminophenyl)thiazolidin-4-one, 2-methoxycarbonylimino-3-(2-formamidophenyl)thiazolidin-4-one and 2-methoxycarbonyl-imino-3-(2-acetamidophenyl)-thiazolidin-4-one as fungicides and as anthelmintics.

The following Examples illustrate the preparation of thiazolidine derivatives of general formula I by processes of the invention.

EXAMPLE I

Methyl chloroformate (3.3 g.) is added over the course of 5 minutes to a solution of 2-imino-3-(2-acetamidophenyl)thiazolidin-4-one (8.6 g.) in anhydrous pyridine (55 cc.), the temperature of the reaction mixture being kept below 25° C. The mixture is stirred for 6 hours at a temperature of about 20° C. The pyridine is removed by evaporation under reduced pressure and the residue is taken up in methylene chloride (150 cc.). The organic solution is successively washed with distilled water (100 cc.), N hydrochloric acid (2 × 50 cc.) and distilled water (2 × 100 cc.). After drying, and evaporating the solvent under reduced pressure, a crystalline residue is obtained which is filtered off and washed with boiling ethanol (50 cc.). After drying, 2-methoxycarbonylimino-3-(2-acetamidophenyl)thiazolidin-4-one (3.2 g.), melting at 221° C, is obtained.

2-Imino-3-(2-acetamidophenyl)thiazolidin-4-one used as starting material can be prepared in the following manner:

2-Chloroacetamido-acetanilide (27.7 g.) is added to a solution of potassium thiocyanate (11.8 g.) in acetone (122 cc.) and the mixture is heated under reflux for 4 hours. After cooling, the product is filtered off. The precipitate obtained is washed with water and dried to give 2-imino-3-(2-acetamidophenyl)-thiazolidin-4-one (15.8 g.) melting at 180° C.

2-Chloroacetamido-acetanilide (m.p. 200° C. with sublimation) can be prepared by reaction of chloroacetyl chloride with 2-amino-acetanilide in methylene chloride, in the presence of anhydrous triethylamine.

2-Amino-acetanilide (m.p. 133° C.) can be prepared by the method of Kloetzel et al., J. Med. Pharm. Chem., 1, 197–211 (1959).

EXAMPLE 2

Chloroacetyl chloride (2.7 cc.) is added, with stirring, to a solution of 2-(3-methoxycarbonylthioureido)-1-acetamidobenzene (9 g.) in anhydrous dimethylformamide (90 cc.), the temperature being kept below 10° C. The reaction mixture is then left for 15 hours at a temperature of about 20° C. The reaction mixture is poured into iced water (400 cc.) and the precipitate is filtered off. After washing with distilled water (100 cc.), the product is dried under reduced pressure. 2-Methoxycarbonylimino-3-(2-acetamidophenyl)-thiazolidin-4-one (7.1 g.), melting at 222° C., is thus obtained.

2-(3-Methoxycarbonylthioureido)-1-acetamidobenzene, melting at 218° C., can be prepared by reaction of 2-acetamido-aniline with methoxycarbonylisothiocyanate, prepared in situ by reaction of methyl chloroformate with potassium thiocyanate.

EXAMPLE 3

Methyl chloroformate (3.25 cc.) is added, with stirring, to a suspension of 2-imino-3-(2-formamidophenyl)thiazolidin-4-one (10 g.) in anhydrous pyridine (100 cc.) cooled to about 5° C., the temperature of the reaction mixture not being allowed to exceed 10° C. On completion of the addition, which lasts about 15 minutes, the reaction mixture is a limpid solution. After 2 hours' stirring at a temperature of about 20° C., the reaction mixture is poured into iced water (200 cc.). The precipitate obtained is filtered off, washed with water (2 × 100 cc.) and dried under reduced pressure to give 2-methoxycarbonylimino-3-(2-formamidophenyl)-thiazolidin-4-one (7.9 g.), melting at 262° C. with decomposition.

The following products of general formula I are prepared following the procedure of Example 3 using appropriate starting materials of general formulae II and III:

2-methoxycarbonylimino-3-(2-ethoxycarbonylaminophenyl)thiazolidin-4-one, m.p. 205° C.; 2-methoxycarbonylimino-3-(2-propionamidophenyl)thiazolindin-4-one, m.p. 173° C.; 2-methoxycarbonylimino-3-(2-acetamidophenyl)-5-methylthiazolidin-4-one, m.p. 160° C. and then 180°-185° C. (with decomposition); 2-isopropoxycarbonylimino-3-(2-propionamidophenyl)-thiazolidin-4-one, m.p. 150° C.; 2-methoxycarbonylimino-3-(2-butyramidophenyl)-thiazolidin-4-one, m.p. 184° C.; 2-methoxycarbonylimino-3-(2-acetamidophenyl)-5-phenylthiazolidin-4-one, m.p. 197°-199° C. (with decomposition), and 2-ethoxycarbonylimino-3-(2-ethoxycarbonylaminophenyl)thiazolidin-4-one, m.p. 163° C.

EXAMPLE 4

Iron powder (39.6 g.) is added in small portions, with vigorous stirring, to a suspension of 2-methoxycarbonylimino-3-(2-nitrophenyl)thiazolidin-4-one (33 g.) in water (180 cc.) containing concentrated hydrochloric acid ($d = 1.19$; 0.9 cc.), the temperature of the reaction mixture being kept at about 55° C. Stirring and heating are continued for a further hour after the end of the addition, making a total duration of 3 hours. After cooling, the precipitate is filtered off.

This precipitate is extracted with methylene chloride (500 cc., and then 2 × 300 cc.). After drying the extracts over sodium sulphate and evaporating the solvent under reduced pressure, a residue weighing 27 g. is obtained. This residue, when triturated with ethanol (100 cc.), yields a crystalline product (21 g.) melting at 200°-202° C. After purification by conversion to the hydrochloride and reconversion to the base by addition of potassium bicarbonate, 2-methoxycarbonylimino-3-(2-aminophenyl)thiazolidin-4-one (13 g.), melting at 208° C., is obtained.

2-Methoxycarbonylimino-3-(2-nitrophenyl)-thiazolidin-4-one used as starting material can be prepared in the following manner:

Methyl chloroformate (128 cc. or 155 g.) is added drop-wise and with stirring to a suspension, cooled to 0° C., of 2-imino-3-(2-nitrophenyl)-thiazolidin-4-one (353 g.) in anhydrous pyridine (1.3 litres), the temperature of the reaction mixture not being allowed to exceed 5° C. After completion of the addition, the reaction mixture is allowed to warm up again and is stirred for a further 4 hours at a temperature of about 20° C. Thereafter, the greater part of the pyridine is evaporated under reduced pressure and the thick residue is taken up in methylene chloride (1.5 litres). The organic solution is successively washed with water (1 litre), 3N hydrochloric acid (1 litre) and then water (2 × 800 cc.). After drying and evaporating the methylene chloride under reduced pressure, a residue is obtained, which is taken up in ethanol (600 cc.) with stirring. The precipitate is filtered off and dried to give 2-methoxycarbonylimino-3-(2-nitrophenyl)thiazolidin--4-one (233 g.) melting at 175° C.

2-Imino-3-(2-nitrophenyl)thiazolidin-4-one (m.p. 176° C.), which is used as the starting material can be prepared according to H. Beckurts and G. Frerichs, Arch. der Pharm. 253, 247 (1915).

EXAMPLE 5

A suspension of 2-methoxycarbonylimino-3-(2-nitrophenyl)thiazolidin-4-one (14.7 g.) in ethanol (200 cc.) in an autoclave at 20° C. is hydrogenated in the presence of palladium on charcoal (1 g. containing 3.15 percent of palladium). The initial hydrogen pressure is 40 bars. After three days, the absorption of hydrogen is ended. The reaction mixture is filtered and the precipitate, containing the catalyst, is taken up in acetone (2 × 100 cc.). After evaporation of the solvent, the residue weighing 9 g. is recrystallised from ethyl acetate (162 cc.). 2-Methoxycarbonylimino-3-(2-aminophenyl)thiazolidin-4-one (4.2 g.), melting at 210° C., is thus obtained.

EXAMPLE 6

A suspension of 2-methoxycarbonylimino-3-(2-aminophenyl)thiazolidin-4-one (1 g.) in 98 percent formic acid (10 cc.) is heated for 1 hour at 100° C. After cooling, the reaction mixture is diluted with water (50 cc.). After filtering, drying and concentrating, 2-methoxycarbonylimino-3-(2-formamidophenyl)-thiazolidin-4-one (0.4 g.), melting at 262° C. with decomposition, is obtained.

EXAMPLE 7

Acetic anhydride (0.42 cc.) is added to a solution of 2-methoxycarbonylimino-3-(2-aminophenyl)-thiazolidin-4-one (1 g.) in anhydrous pyridine (5 cc.), and the mixture is heated at 100° C. for 1 hour. After cooling, the reaction mixture is diluted with ethanol (20 cc.). The crystalline precipitate obtained is filtered off, washed with ethanol and dried to give 2-methoxycarbonylimino-3-(2-acetamidophenyl)thiazolidin-4-one (0.7 g.) melting at 219°–221° C.

In the foregoing Examples the melting points indicated are those determined on the Kofler bench.

According to a further feature of the present invention, there are provided fungicidal compositions which contain, as the active ingredient, at least one thiazolidine derivative of general formula I in association with one or more diluents or adjuvants compatible with the thiazolidine derivative(s) and suitable for use in agricultural fungicidal compositions. These compositions can optionally contain other compatible pesticides, such as insecticides or fungicides (e.g. maneb). Preferably the compositions contain between 0.005 percent and 80 percent by weight of thiazolidine derivative.

The compositions may be solid if there is employed a powdered solid compatible diluent such as talc, calcined magnesia, kieselguhr, tricalcium phosphate, powdered cork, adsorbent charcoal, or a clay such as kaolin or bentonite. These solid compositions are preferably prepared by grinding the thiazolidine derivative with the solid diluent, or by impregnating the solid diluent with a solution of the thiazolidine derivative in a volatile solvent, evaporating the solvent, and if necessary grinding the product so as to obtain a powder.

Instead of a solid diluent, there may be used a liquid in which the thiazolidine derivative is dissolved or dispersed. The compositions may thus take the form of suspensions, emulsions or solutions in organic or aqueous-organic media, for example aromatic hydrocarbons such as toluene or xylene, mineral, animal or vegetable oils, or acetophenone, or mixtures of these diluents. The compositions in the form of suspensions, emulsions or solutions may contain wetting dispersing or emulsifying agents of the ionic or nonionic type, for example sulphoricinoleates, quaternary ammonium derivatives or products based or condensates of ethylene oxide with octylphenol, or fatty acid esters of anhydrosorbitols which have been rendered soluble by etherification of the free hydroxyl groups by condensation with ethylene oxide. It is preferable to use agents of the non-ionic type because they are not sensitive to electrolytes. When emulsions are required the thiazolidine derivatives may be used in the form of self-emulsifying concentrates containing the active substance dissolved in the emulsifying agent or in a solvent containing an emulsifying agent compatible with the thiazolidine derivative and solvent, a simple addition of water to such concentrates producing compositions ready for use.

The thiazolidine derivatives of general formula I are preferably used as fungicides in quantities of 5 to 200 g. per hectolitre of water.

The following Example illustrates fungicidal compositions of the present invention.

EXAMPLE 8

A wettable powder containing 50 percent by weight of active material, and having the following composition, is prepared in accordance with the usual technique:

| | |
|---|---|
| 2-methoxycarbonylimino-3-(2-aminophenyl)-thiazolidin-4-one | 50 g. |
| kieselguhr | 29 g. |
| polyoxyethylene-sorbitan monooleate (non-ionic emulsifier) | 1 g. |
| calcium lignosulphonate | 20 g. |

The present invention also includes pharmaceutical and veterinary compositions which comprise, as the active ingredient, at least one thiazolidine derivative of general formula I in association with a carrier or coating generally used in the preparation of pharmaceutical and veterinary compositions. The compositions are preferably in a form suitable for oral administration.

Tablets, pills, powders or granules can be used as solid compositions for oral administration. In these compositions the thiazolidine derivative is mixed with one or more inert diluents, such as sucrose, lactose or starch. These compositions can also contain substances other than diluents, for example lubricants such as magnesium stearate.

Pharmaceutically acceptable emulsions, solutions, suspensions, syrups and elixirs, containing inert diluents such as oil, or paraffin oit, can be used as liquid compositions for oral administration. These compositions can also contain substances other than the diluents, such as, for example, wetting agents or sweetening or flavouring agents.

In veterinary therapy, the thiazolidine derivatives can be used for the treatment of nematodal helminthiases of cattle, sheep, goats and domestic animals in general, at single dosages of between 25 and 100 mg./kg. animal body weight, administered orally.

In human therapy, the thiazolidine derivatives can be used at dosages of between 10 and 50 mg./kg. administered orally. These dosages can be repeated at regular intervals of several days or several weeks to achieve definitive removal of the parasite.

In general, the physician or veterinary surgeon will decide the posology which is considered most appropriate, depending on the species in question as well as the age, the weight, the degree of infection and all other factors peculiar to the subject to be treated.

The following Examples illustrate therapeutic compositions according to the invention.

EXAMPLE 9

Tablets, weighing 0.7 g., having the following composition are prepared in accordance with the usual technique:

| | |
|---|---|
| 2-methoxycarbonylimino-3-(2-acetamidophenyl)thiazolidin-4-one | 0.500 g. |
| wheat starch | 0.150 g. |
| colloidal silica | 0.040 g. |
| magnesium stearate | 0.010 g. |

EXAMPLE 10

Starch (19 g.) is added to micronised 2-methoxycarbonylimino-3-(2-aminophenyl)thiazolidin-4-one (80 g.) (of which at least 80 percent of the particles have a particle size less than 10 $\mu$). Sodium dioctylsulphosuccinate (1 g.) dissolved in the smallest possible amount of water is added to the mixture thus obtained. The whole is malaxated, a sufficient amount of water being added to yield a thick paste. The paste is thereafter dried, ground and then sieved so as to produce a powder in which the particle size is identical to that of the initial active product.

The resulting powder can be suspended in water and administered orally (for example by means of a gun) to domestic animals as an anthelmintic at the rate of 25 to 100 mg./kg. of active substance per dose.

I claim:

1. Thiazolidine derivatives of the formula:

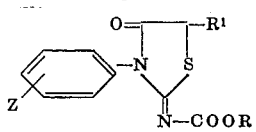

wherein R represents alkyl of one through four carbon atoms, $R^1$ represents hydrogen, alkyl of one through four carbon atoms or phenyl, and Z represents amino or a group $-NH-CO-R^2$ in which $R^2$ represents hydrogen, or alkyl or alkoxy of one through four carbon atoms.

2. Thiazolidine derivatives according to claim 1 wherein R represents methyl, ethyl or isopropyl, $R^1$ represents hydrogen, methyl or phenyl, and Z represents amino, or a group $-NH-CO-R^2$ in which $R^2$ represents hydrogen, methyl, ethyl, propyl or ethoxy.

3. Thiazolidine derivatives according to claim 1 in which the substituent Z is in the ortho-position of the phenyl radical.

4. Thiazolidine derivatives according to claim 1 wherein R represents methyl or ethyl, $R^1$ represents hydrogen, and Z represents amino, formamido or acetamido in the ortho-position of the phenyl radical.

5. The thiazolidine derivative according to claim 1 which is 2-methoxycarbonylimino-3-(2-formamidophenyl)thiazolidin-4-one.

6. The thiazolidine derivative according to claim 1 which is 2-methoxycarbonylimino-3-(2-acetamidophenyl)thiazolidin-4-one.

7. The thiazolidine derivative according to claim 1 which is 2-methoxycarbonylimino-3-(2-ethoxycarbonylaminophenyl)thiazolidin-4-one.

8. The thiazolidine derivative according to claim 1 which is 2-methoxycarbonylimino-3-(2-propionamidophenyl)thiazolidin-4-one.

9. The thiazolidine derivative according to claim 1 which is 2-methoxycarbonylimino-3-(2-acetamidophenyl)-5-methylthiazolidin-4-one.

10. The thiazolidine derivative according to claim 1 which is 2-isopropoxycarbonylimino-3-(2-propionamidophenyl)thiazolidin-4-one.

11. The thiazolidine derivative according to claim 1 which is 2-methoxycarbonylimino-3-(2-butyramidophenyl)thiazolidin-4-one.

12. The thiazolidine derivative according to claim 1 which is 2-methoxycarbonylimino-3-(2-acetamidophenyl)-5-phenylthiazolidin-4-one.

13. The thiazolidine derivative according to claim 1 which is 2-ethoxycarbonylimino-3-(2-ethoxycarbonylaminophenyl)thiazolidin-4-one.

14. The thiazolidine derivative according to claim 1 which is 2-methoxycarbonylimino-3-(2-aminophenyl)-thiazolidin-4-one.

* * * * *